Sept. 2, 1969          J. U. HARPER          3,464,296
ADJUSTABLE JIG FOR HOLE FORMING
Filed March 16, 1967
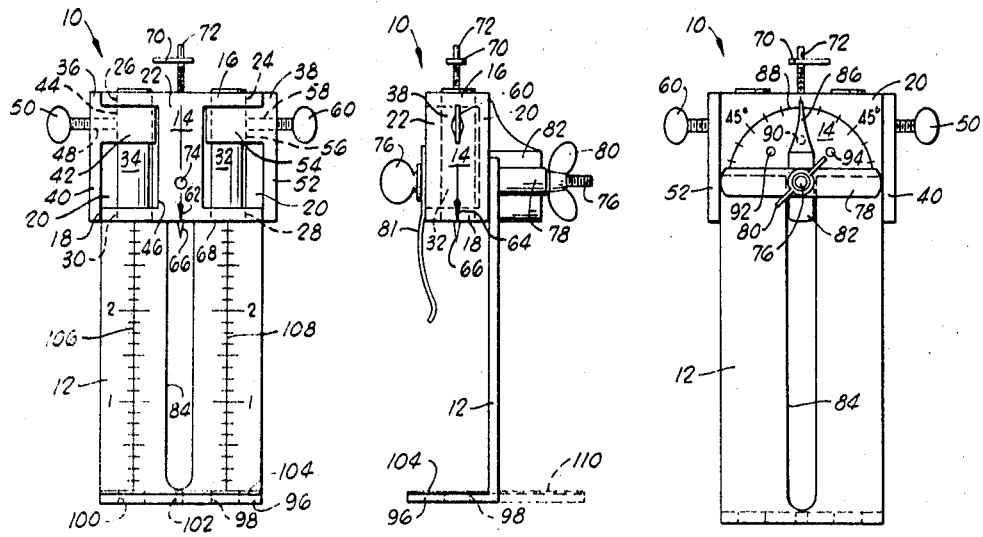
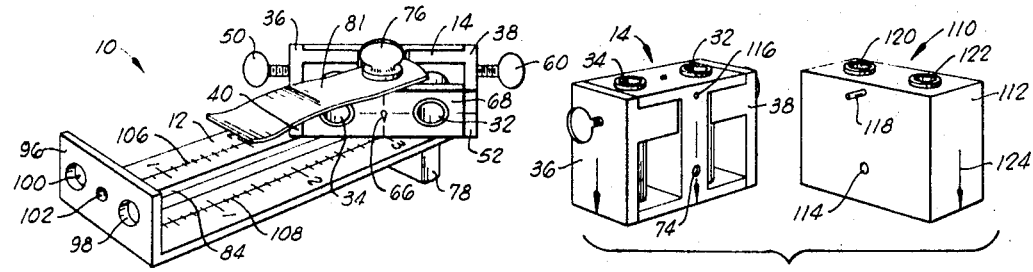
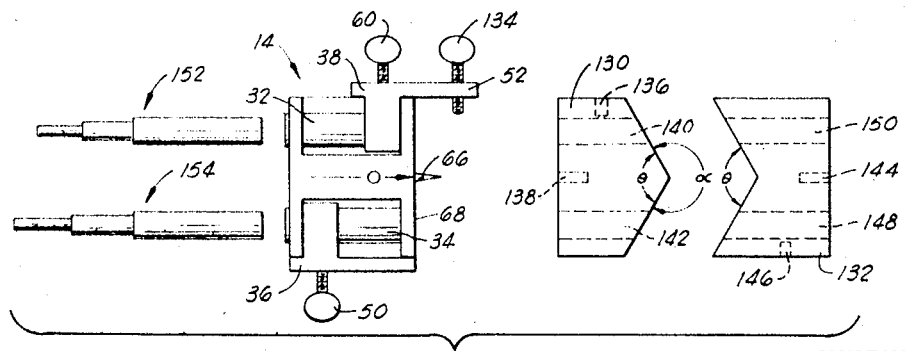
INVENTOR.
JAMES U. HARPER
BY
*Dunlap and Laney*
ATTORNEYS United States Patent Office 3,464,296
Patented Sept. 2, 1969

3,464,296
ADJUSTABLE JIG FOR HOLE FORMING
James U. Harper, P.O. Box 1321, Enid, Okla. 73701
Filed Mar. 16, 1967, Ser. No. 623,752
Int. Cl. B23b 47/28, 49/00
U.S. Cl. 77—62          10 Claims

ABSTRACT OF THE DISCLOSURE

An apparatus providing a guideway for a hole forming tool which consists of a guide block having aligning bores of predetermined size and spacing therethrough, the guide block being adjustably retained upon a clamping frame which serves to maintain the guide block in varied attitudes in coacting position with a workpiece.

BACKGROUND OF THE INVENTION

Field of the invention

The invention relates generally to an adjustable device for providing variable jig functions in connection with a work piece and more particularly, but not by way of limitation, it relates to an improved dowel jig structure which is easily adjustable for application to a work piece to enable various dowelling functions.

SUMMARY OF THE INVENTION

The present invention contemplates an adjustable jig device wherein a tool guide is maintained in a selected one of various positions relative to a work piece. In a more limited aspect, the invention contemplates a guide block having a plurality of hole guides disposed therethrough in predetermined spacing and a clamping member for receiving a work piece and holding the guide block in predetermined relationship at a selected point on the work piece. The invention is particularly characterized by its adjustability features in that the jig device can be manipulated with ease and accuracy for employ as a work guide upon any of various thicknesses and angular configurations of work piece. Further, the invention includes adaptive block means for affixture to the guide block to enable the carrying out of still further work functions.

Therefore, it is an object of the present invention to provide an adjustable hole forming device which is applicable in a wide variety of uses and which is manually adjustable to the various applications.

It is also an object of the present invention to provide a dowel jig aligning device which is equally applicable for use in forming any of butt joints, half angle joints, bridge bracing, etc., by simple manual adjustment of the device.

It is still further an object of this invention to provide an adjustable hole forming device having linearly graduated components and center-marking indications which afford precise measurements of the work piece relative to the hole forming device.

Finally, it is an object of the present invention to provide a dowel jig device which is easily adjustable to perform varied guide functions about a work piece by the manual arrangement of the same components.

Other obects and advantages of the invention will be evident from the following detailed description when read in conjunction with the accompanying drawings which illustrate the invention.

BRIEF DESCRIPTION OF THE DRAWING

FIG. 1 is a front view in elevation of the adustable hole forming device with the spring clamp removed;

FIG. 2 is a side view of the device of FIG. 1;

FIG. 3 is a rear view of the device of FIGS. 1 and 2;

FIG. 4 is an operational view in perspective of the adustable hole forming device;

FIG. 5 depicts the guide block of the hole forming device in coaction with one form of adaptive block; and FIG. 6 depicts another view of the guide block in coaction with still further adaptive blocks which serve to carry out specific functions.

DESCRIPTION OF THE PREFERRED EMBODIMENT

Referring particularly to FIGS. 1, 2 and 3, the adjustable hole forming device 10 consists of a clamping plate 12 having a guide block 14 slidably mounted thereon. The guideblock 14 is preferably cast or otherwise formed as an integral unit having upper and lower horizontal plate members 16 and 18 which are joined together by a vertically extending backplate member 20 and a generally block-like central body portion 22 which also extends vertically between the upper and lower plate members 16 and 18 and which is formed normal to the back plate member 20. Thus, guide block 14 may be an integral unit formed to extend the various surfaces and projections, or it may be formed from selected plates and blocks joined together by suitable fastening means.

The upper plate member 16 of guideblock 14 is formed to have two symmetrically spaced holes 24 and 26 bored vertically therethrough and similar aligning holes 28 and 30 are formed through the lower plate means 18. Aligned holes 24 and 28 receive a sleeve member 32 therein and aligned holes 26 and 30 receive a sleeve 34 vertically therethrough. The sleeves 32 and 34 are formed of selected tubing of predetermined inside diameter and they may be press-fit or otherwise secured in their vertical disposition extending through upper and lower plate members 16 and 18 to provide guideways for receiving hole cutting implements and maintaining them in proper alignment to a work piece.

A pair of side guides 36 and 28 are provided on each side of the guide block 14 and each is adjustable vertically to perform various adaptive functions in conjunction with different forms of work pieces. Side guide 36 consists of a side plate 40 which is formed to extend a block-like portion 42. The block portion 42 has a hole 44 cut vertically therethrough and the sleeve 34 is slidingly retained therein. Further, the inwardly extending block portion 42 is of a precise size such that it is slidable along sleeve 34 and is maintained in similar sliding engagement to inner side wall 46 of central body portion 22 as well as to the back plate member 20. A threaded bore 48 is placed horizontally through the side guide 36 to receive a set screw 50 which enables the side guide 36 to be adjustably positioned vertically along sleeve 34. Similarly, the opposite side guide 38 is formed with a side plate 52 and generally block-like inwardly extending portion 54 which is retained about sleeve 32 by means of its vertical hole 56. Side guide 38 may also be adjustably positioned vertically with respect to guide block 14 by means of the threaded bore 58 and set screw 60.

A center marking line 62 may be scored in the facing of central body portion 14, and, similarly, the side guides may be center marked as by scoring 64 shown on side guide 38 (FIG. 2). Also, a marking or holding center pin 66 is mounted at the center of the bottom or engaging surface 68 of the guide block 14. A drill depth gauge may be provided on the top of guide block 14 by slidably mounting a gauge marker 70 on a vertical rod 72 which is tapped into the upper surface of guide block 14. The marker 70 is preferably formed of rubber impregnated with magnetic material so that it will better maintain its slidable vertical position.

A horizontal hole 74 is provided through the central body portion 22 of guide block 14 for the purpose of receiving clamping fixtures. Referring to FIG. 2, a clamping bolt 76 is inserted through the hole 74 to retain the guide block 14 in secure position against the clamping plate 12. The clamping bolt 76 extends through a horizontal clamping bar 78 which is brought to bear on the rear side of clamping plate 12 by means of a wing nut 80. Clamping bolt 76 also serves to secure a spring clamp 81 on the front side of guide block 14.

A vertical clamping bar 82 (FIG. 3) provides precise alignment of the clamping plate 12 relative thereto. Thus, horizontal and vertical clamping bars 78 and 82 may be formed as an integral piece or they may be two separate pieces having inter-locking, grooved cut-outs each receiving the clamping bolt 76 centrally therethrough. The vertical clamping bar 82 is formed to have sides which fit precisely in sliding engagement within the sides of adjusting slot 84 which runs the length of clamping plate 12. This then insures a proper perpendicular relationship between clamping plate 12 and the engaging face 68 of guide block 14 at all times.

The vertical clamping bar 82 is also formed to have an upper portion 86 which is shaped into a pointer whereupon protracted angular scoring 88 may be placed upon the back side of back plate member 20 in coaction with pointer portion 86 of clamping bar 82. Thus, pointer 86 can be set at a selected angle on scoring 88 and, due to the parallel or linearly aligned relationship of clamping plate 12 and vertical clamping bar 82, that angle will be struck as between the adjusting slot 84 of clamping plate 12 and engaging surface 68 of guide block 14. Ball and socket engaging means such as shown at 90 may be employed for some of the most often used angles. Thus, the holes 92 and 94 would serve as ball locking points for the opposing forty-five degree angle settings.

The clamping plate 12 is formed to have a perpendicular flange 96 at its remote end, this serving as a holding or footing member depending upon the usage. The perpendicular flange 96 has holes 98 and 100 therethrough which are aligned with respective sleeves 32 and 34 and which are of slightly larger size to allow passage of the hole cutting implement therethrough when necessary. A smaller central hole 102 is also cut through the flange 96 to allow passage of the center pin 66 therethrough when the clamp member 12 is drawn entirely up against the guide block 14 as for certain free-position dowelling operations where the center mark only is employed. The inner surface of flange 96 is preferably bonded with a suitable non-skid material 104, various types of which are well known.

The clamping plate means 12 may be scored to have a linear measure thereon as shown in FIG. 1. The graduated markings 106 and 108 extend along each side of clamping plate 12 and they may be employed with the center markings (not shown) on the engaging surface 68 of guide block 14 to give precise dimensions and angular relationships for attachment to a work piece in predetermined manner. In some cases it may be desirable to reverse the clamping plate 12 as shown by the dashed line position 110 in FIG. 2. This is valuable in certain forms of cabinetry dowelling and, in this event, it is desirable to score linear measure graduation on the reverse side of clamping plate 12, that side exposed in FIG. 3, with zero graduation set at the outside edge of flange 96.

OPERATION OF THE PREFERRED EMBODIMENT

FIG. 4 shows one example of the hole forming device 10 in operational latitude. The device 10 is adjusted for drilling a pair of dowel holes along a forty-five degree cut of a board, i.e., as might be the case in construction of a picture frame or such. Thus, in accordance with the known dimensions of the work, the securing wing nut 80 (FIG. 2) can be loosened so that guide block 14 can be rotated relative to the clamping plate 12. Thus, as shown in FIG. 3, the pointer bar 82 would be set at a proper 45 degree angle mark (ball sockets 92 or 94 providing a lock) and this positioning would, in turn, orient the clamping plate 12 due to the precise alignment of pointer bar 82 within the slot 84. While the wing nut 80 is still untightened, the guide block 14 can be moved longitudinally relative to the slot 84 to set the center pointer 66 at a predetermined linear measure unit along the graduated scale 108 scored on clamping plate 12. As shown in FIG. 4, this is set at three inches as might be required for a board six inches wide in order to place the dual dowel holes about the center point.

The clamping wing nut 80 (FIG. 2) can then be tightened to secure all component parts of the hole forming device 10 into the selected operating relationship. Guide block 14 is maintined fast upon clamping plate 12 due to the clamping effect of transverse bar 78 and pointer bar 82, and the spring clamp 81 is secured as generally oriented along clamping plate 12. The work piece, a forty-five degree cut board or panel, would then be inserted between clamping plate 12 and spring clamp 81 with its outer or straight edge resting against footing flange 96 and the forty-five degree cut being brought into contact with the engaging surface 68 of guide block 14. The work piece is then maintained in secure positioning relative to the guide block 14 and a drill or other such hole forming device can be inserted through the guide sleeves 32 and 34 to bore holes into the work piece in a preselected alignment.

The hole forming device 10 can then be reversed and retightened for formation of a mating or right-hand work piece of complementary cut. This is easily done by loosening the wing nut 80 and shifting the guide block 14 to the opposite forty-five degre angle setting relative to clamping plate 12, taking care to set the center pointer 66 and related center scoring on the proper unit of the linear measure graduation 106. The mating forty-five degree work piece is then inserted between clamping plate 12 and spring clamp 81 and into contact with the engaging surface 68 of guide block 14 whereupon the holes may be drilled by insertion of the tool through sleeves 32 and 34.

The foregoing describes only one mode of operation of the hole forming device 10. The device is adjustable in various ways to enable it to effect a wide variety of patterning operations relative to varied shapes of work piece. For example, butt joining work can be done by turning the clamping plate 12 over relative to guide block 14 (as shown by dotted lines 110 of FIG. 2). This allows a work piece to be slipped endwise between clamping plate 12 and spring clamp 81 for hole forming as positioned by the guide block 14. Measurements as between mating pairs of work pieces can be taken with respect to the centering pin 66, and the joined surfaces and dowelling holes will always align properly.

Actually, the manner of use or operation of the hole forming device 10 is virtually unlimited. The device may be constructed of rugged, precisely meshing mating materials and it can be operated in any of various orientations to carry out a desired work positioning function. Thus, spring clamp 81 may or may not be employed, clamping plate 12 may be operated with either flat surface facing the guide block 14 and at any angle relative to guide block 14 as set by the graduated scale 88 (FIG. 3). The device 10 has such a variation of operating attitudes that the operator's skill and ingenuity will contribute greatly to its varied and valuable usage.

Adjustable side guides 36 and 38 may be positioned downwardly removed from the guide block 14 in certain applications. For example, the side guide 36 can be lowered along guide block 14 (hole 44 sliding along sleeve 34) and clamped by locking screw 50 such that side plate 40 and engaging surface 68 form a right angular pocket for receiving a work piece. Thereafter, holes cut for a mating work piece can be made by reversing the attitude of side guides 36 and 38. That is, locking screw 50 is loosened and retightened with side-guide 36 retracted upward in guide block 14 while guide block 38 is lowered and locking screw 60 set such that an opposite right angular pocket is formed by side plate 52 and the engaging surface 68.

ALTERNATE EMBODIMENTS

FIG. 5 shows an adaptor 110 which can be employed in coaction with the side guide 14 to multiply the hole forming capability. The adaptor 110 consists of a block 112 which is shaped generally similar to the guide block 14. The block 112 is formed with a horizontal securing hole 114 centrally through its broad side for alignment with the securing hole 74 in the guide block 14. A dowel hole 116 may be formed in the guide block 14 and a mating dowel pin 118 is placed in the adaptor block 112, such that guide block 14 and adaptor block 110 can be secured together by insertion of the securing bolt 76 through both the securing bolt hole 74 and the securing hole 114.

The adaptor block 110 is formed with vertical bores which provide additional hole forming passages in predetermined spacing and dimension relative to the guide block 14. In this case, the adaptor block 112 is formed with two vertical holes which receive the sleeve guide members 120 and 122, respectively, therethrough. Thus, in its assembled attitude, the adaptor 110 is secured to the guide block 14, and the unit provides four hole capability consisting of the four equi-spaced vertical sleeves 32, 34, 120 and 122 which serve to guide the hole forming apparatus or such. The adaptor 110 may also be scored with centering marks such as side centering arrow 124 and a centering pin (not shown) may be provided on the lower or work facing of the adaptor block 112.

Once the adaptor 110 is assembled unitarily with guide block 14 the unit can be employed with the clamping plate 12 through its various adjustments and applications to perform the positioning function on a variety of work pieces. Also, the side guides 36 and 38 can be adjusted such that they still provide a right angle edging function for the bore-hole forming unit when it is deemed applicable.

FIG. 6 shows still further adaptive elements which are particularly useful in forming bridges or cross-bracing members between angularly joined boards or beams. A pair of mating adaptor blocks 130 and 132 having complementing facing angles alpha ($\alpha$) and theta ($\theta$), respectively, may be joined to the guide block 14. In this case either one or both of the side guides 36 and/or 38 is employed as a clamping member. Thus, the side guide 38 is fitted with a clamping screw 134 through the end of side plate 52 for the purpose of securing one of the adaptor blocks 130 or 132.

The inside adaptor 130 is formed to have a tapped bore 136 which receives the clamping screw 134 therein so that the adaptor block 130 is held firmly against the engaging surface 68, the center pointer 66 meshing into a hole 138 to provide a further locking point. The adaptor 130 is formed with spaced, horizontal bores 140 and 142 which are positioned to mate with the sleeves 32 and 34, respectively, of guide block 14 when the adaptor 130 is attached in operative alignment. The hole forming device including adaptor 130 is then operative to form dowel holes for bridge bracing between work pieces which are joined at angle alpha ($\alpha$).

Mating dowel holes can be provided by attaching an outside adaptor 132 to the guide block 14. Thus, adaptor 132 has a tapped hole 144 and center hole 146 with longitudinal bores 148 and 150 such that it too can be secured by clamping screw 134 to the engaging surface 68 of guide block 14 such that guide holes 148 and 150 align with respective sleeves 32 and 34, and adaptor 132 exposes an exterior angle theta ($\theta$) to be braced against the work piece. The angle theta ($\theta$) would be that which is shown by the joint side of the brace member itself and the properly spaced and aligned dowel holes can be placed therein in aligning relationship with the previously formed holes in the angularly oriented members to be braced. While the angles alpha ($\alpha$) and theta ($\theta$) are employed by way of illustration, it should be understood that a great number of complementary adaptors may be provided for the operator's selection.

FIG. 6 shows a still further embellishment wherein the size of the hole boring passages may be varied by the insertion of sleeves of selected size. Thus, a selected combination of the tubing or sleeve member 152 may be inserted in the sleeve 32 and, similarly, the matching combination of sleeve members 154 would be inserted in sleeve 34. The selection of the sleeve diameter or dowel bore would depend upon the particular work being performed, the precision required, etc. It should be understood too that inclusion of the adaptor blocks 130 or 132 as well as the employment of sleeve members 152 and 154, would in no way hinder the use of the clamping plate 12 and its various graduation and adjustment features.

The foregoing discloses a hole forming device which is highly versatile in that it is precisely constructed of rugged, durable material and it includes a variety of adjustable features which enable its usuage in a great number of hole forming applications. The device is of relatively simple construction and easily adjustable by the operator's manipulation to meet any of many needs. Further, the device lends itself to use with various mating and adaptive elements which may be specifically constructed or which may be of the operator's own design and addition as necessitated by specific hole forming functions.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:
1. A hole forming jig device, comprising:
    clamping plate means being of generally rectangular shape and having a slot formed along its length and having one end formed as a perpendicularly bent footing flange;
    a guide block including a central body portion of generally block form having a central securing hole therethrough, and upper and lower plates rigidly affixed across the upper and lower extremities of said central body portion and each extending on each side thereof with at least one additional hole formed in alignment through one of said upper and lower plates on each side of said central body portion, said at least one additional hole being perpendicular to and separate from said securing hole;
    securing means extending through said securing hole and said slot for releasably affixing said guide block to said clamping plate means;
    hole guide means of predetermined inner diameter extending through said at least one additional hole in the guide blocks; and
    means for indicating an angle formed by the axis of the hole guide means in the plane of said clamping plate footing plan for variable positions of affixture of said guide block to said clamping plate means.
2. A hole forming jig device as set forth in claim 1 which is further characterized to include:
    a pair of side guide means which are movably secured on each side of said guide block, said side guide means each having a side plate and a block portion which extends inward of said guide block and has a hole through which respective hole guide means are slidably retained; and means for fixing the position of the respective side guide means with respect to said guide block.

3. A hole forming jig device as set forth in claim 1 wherein said securing means comprises:
a securing bolt which extends through said guide block central securing hole and through said slot formed in said clamping plate means;
a transverse clamping bar overlying said clamping plate and receiving said securing bolt therethrough; and
a wing nut threaded to fit upon said securing bolt to hold said transverse clamping bar, said clamping plate means and said guide block in selected rigid affixture.

4. A hole forming jig device, comprising:
clamping plate means of generally rectangular shape with a longitudinal center slot formed therethrough, said plate means having a perpendicular footing flange at one end;
guide block means formed to have upper and lower plate members, a back plate member, and a central body portion, said central body portion having a securing hole therethrough and said upper and lower plate members having axially aligned holes therethrough on each side of said central body portion;
sleeve means of predetermined inner diameter extending through each of said axially aligned holes;
side guide means adjustably securing on each side of said guide block means for retractable positioning thereon, said side guide means each being formed as a side plate having an inwardly extending block portion containing a hole through which respective sleeve means are slidingly retained;
securing means extending through said securing hole and said center slot for releasably affixing said guide block means to said clamping plate means;
spring clamp means formed of resilient material and fastened by said securing means to bear toward the plane of said clamping plate means; and
means for indicating the angle formed by the axis of the respective sleeve means and the orientation of said clamping means for variable positions of affixture of said guide block means to said clamping plate means.

5. A hole forming jig device as set forth in claim 4 wherein said securing means comprises:
a securing bolt which extends through said spring-clamp means, said central body portion securing hole, and through said longitudinal center slot of the clamping plate means;
clamping means overlying said clamping plate and receiving said securing bolt therethrough; and
a wing-nut threaded to fit upon said securing bolt to hold said clamping means, said clamping plate means, said spring clamp means and said central body portion of the guide block means in selected rigid affixture.

6. A hole forming jig device as set forth in claim 5 wherein said clamping means comprises:
a horizontal clamping bar overlying said clamping plate and receiving said securing bolt therethrough; and
a vertical clamping bar receiving said securing bolt therethrough and having one end formed as a pointer, said vertical clamping bar being slidably retained in alignment with said longitudinal center slot; and
means providing a graduated angular marking scale on the back of said clamping plate means and adjacent the pointed end of said vertical clamping bar means such that said pointer indication is continually aligned with said clamping plate means and indicates the relative angle of said guide block means with respect thereto.

7. A hole forming jig device as set forth in claim 6 which is further characterized to include:
a plurality of hole indentations formed in the back of said clamping means in alignment with plural selected angles as formed by the pointer of said vertical clamping bar with respect to said guide block means; and
ball means retained in the pointer end of said vertical clamping bar in the surface adjacent the back of said clamping plate means such that it can be received within said holes to assure a selected angle of clamping.

8. A hole forming jig device as set forth in claim 4 which is further characterized to include:
depth gauge means secured to the upper plate member of said guide block means in parallel alignment with sail sleeve means and in equal spacing therebetween.

9. A hole forming jig device as set forth in claim 4 which is further, characterized to include:
second guide block means having a securing hole therethrough and at least one additional hole therethrough perpendicular to and separate from said securing hole;
means for securing said second guide block means to said guide block means such that said at least one additional hole is placed in parallel alignment with said sleeve means to enable multiple hole placement.

10. A hole forming jig device as set forth in claim 4 which is further characterized to include:
second guide block means having an engaging surface which presents a predetermined angle with respect to a work piece, said second guide means having axially aligned holes therethrough on each side of said angular apex;
means for securing said second guide block means to said guide block means such that respective axially aligned holes are aligned with each other.

References Cited

UNITED STATES PATENTS 2,903,920  9/1959  Blecha _____ 77—62
1,207,717  12/1916  Dartt _____ 77—55 XR FRANCIS S. HUSAR, Primary Examiner U.S. Cl. X.R.

145—129